US008547512B2

(12) United States Patent
Lee

(10) Patent No.: US 8,547,512 B2
(45) Date of Patent: Oct. 1, 2013

(54) MULTI-DOMAIN VERTICAL ALIGNMENT LIQUID CRYSTAL DISPLAY PANEL INCLUDING PROJECTIONS WITH ADJUSTABLE HEIGHT

(75) Inventor: Chia-Yu Lee, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 178 days.

(21) Appl. No.: 13/376,193

(22) PCT Filed: Nov. 3, 2011

(86) PCT No.: PCT/CN2011/081717
§ 371 (c)(1),
(2), (4) Date: Dec. 4, 2011

(87) PCT Pub. No.: WO2013/060039
PCT Pub. Date: May 2, 2013

(65) Prior Publication Data
US 2013/0107172 A1    May 2, 2013

(30) Foreign Application Priority Data

Oct. 28, 2011 (CN) .......................... 2011 1 0335237

(51) Int. Cl.
*G02F 1/1337* (2006.01)
(52) U.S. Cl.
USPC .......................................... 349/129; 349/130
(58) Field of Classification Search
None
See application file for complete search history.

(56) References Cited

U.S. PATENT DOCUMENTS

| | | | |
|---|---|---|---|
| 2006/0109405 A1* | 5/2006 | Chang et al. | 349/129 |
| 2007/0188690 A1* | 8/2007 | Ochiai et al. | 349/129 |
| 2010/0007826 A1* | 1/2010 | Lu et al. | 349/114 |

FOREIGN PATENT DOCUMENTS

JP            11-271712 A   * 10/1999

OTHER PUBLICATIONS

English translation of international search report for PCT/CN2011/081717, mailing date Jun. 14, 2012.*

* cited by examiner

*Primary Examiner* — Mike Stahl
(74) *Attorney, Agent, or Firm* — Cheng-Ju Chiang

(57) ABSTRACT

A multi-domain vertical alignment liquid crystal display panel includes a first substrate, a second substrate, a liquid crystal layer, and at least one projection. The second substrate is opposite to the first substrate. The liquid crystal layer is interposed between the first and second substrates. The projection is formed in the first substrate. In displaying a dark state, a lower surface of the projection is on the same plane as a lower surface of the first substrate; and in displaying a bright state, the projection bulges outward to have the lower surface of the projection projecting outward beyond the lower surface of the first substrate. When the multi-domain vertical alignment liquid crystal display panel displays a dark state, the projection does not undergo deformation so that the projection does not affect the directions of the liquid crystal molecules contained in the liquid crystal layer thereby eliminating occurrence of light leakage.

20 Claims, 5 Drawing Sheets

MULTI-DOMAIN VERTICAL ALIGNMENT LIQUID CRYSTAL DISPLAY PANEL INCLUDING PROJECTIONS WITH ADJUSTABLE HEIGHT

BACKGROUND OF THE INVENTION

1. Field of the Invention

The present invention relates to a display device, and in particular to a multi-domain vertical alignment (MVA) liquid crystal display panel.

2. The Related Arts

Flat display devices, such as liquid crystal display (LCD), possess the advantages of being compact and lightweight, saving energy, and being free of radiation so that the flat display devices gradually replace the traditional cathode ray tube (CRT) displays and become the main stream of display devices. Nowadays, the liquid crystal display devices are widely used in a variety of electronic devices, such as digital televisions, computers, personal digital assistants, mobile phones, and digital cameras.

The currently available liquid crystal display devices are generally twist nematic liquid crystal displays, in-plane switching (IPS) liquid crystal displays, and vertical alignment liquid crystal displays.

FIG. 1 is a schematic view showing a conventional vertical alignment liquid crystal display panel, in which (a) illustrates a schematic view of the vertical alignment liquid crystal display panel in a dark state, and (b) indicates the vertical alignment liquid crystal display panel in a bright state. As shown in FIG. 1, a vertical alignment liquid crystal display panel 100 comprises an upper substrate 110, a lower substrate 120, and a liquid crystal layer 130 interposed between the upper and lower substrates. The upper substrate 110 comprises a glass substrate 111, an electrode layer 112, an alignment film 113, and a polarization plate 114. The lower substrate 120 comprises a glass substrate 121, an electrode layer 122, an alignment film 123, and a polarization plate 124.

Those skilled in the art may appreciate that the upper substrate 110 can be a color filter substrate and further a color filter (not shown) arranged thereon. The electrode layer 112 of the upper substrate 110 is a common electrode layer, which is made of a transparent conductive material (such as ITO or IZO). The lower substrate 120 can be a thin film transistor substrate and further comprises an array of thin film transistors (not shown). The electrode layer 122 of the lower substrate 120 is a pixel electrode layer, which comprises a plurality of pixel electrodes, which is controlled by the corresponding thin film transistors of the thin film transistor array and which are respectively made of a transparent conductive material (such as ITO or IZO). Further, the polarization plate 114 of the upper substrate 110 and the polarization plate 124 of the lower substrate 120 have polarization directions that are substantially perpendicular to each other, namely the polarization directions are different by 90 degrees.

The liquid crystal molecules contained in the liquid crystal layer 130 are negative type liquid crystal molecules, namely having $\Delta\epsilon$ less than 0. Thus, the vertical alignment liquid crystal display panel 110 uses the alignment film 113 of the upper substrate 110 and the alignment film 123 of the lower substrate 120 to have the liquid crystal molecules of the liquid crystal layer 130 substantially perpendicular to the upper substrate 110 and the lower substrate 120 is a dark state.

When no voltage is applied between the electrode layer 112 and the electrode layer 122, the liquid crystal molecules of the liquid crystal layer 130 are not rotated. Since the polarization directions of the polarization plate 114 and the polarization plate 124 are perpendicular to each other, light is not allowed transmit through the vertical alignment liquid crystal display panel 100, which is now set in the dark state, as shown in FIG. 1(a).

When a voltage is applied between the electrode layer 112 and the electrode layer 122, the liquid crystal molecules contained in the liquid crystal layer 130 are rotated, causing rotation of light, so that the light can transmit through the vertical alignment liquid crystal display panel, which is now set in a bright state, as shown in FIG. 1(b).

To avoid the issues of gray level inversion and oblique view angle being excessively small, a technique of division of multiple domain has been developed on the basis of the vertical alignment liquid crystal display panel, which divides a display panel into a plurality of fields, so as to make the liquid crystal molecules of the liquid crystal layer showing a plurality of tilt directions in order to overcome the above discussed problems.

FIG. 2 is a schematic view showing a conventional multi-domain vertical alignment (MVA) liquid crystal display panel. As shown in FIG. 2, the conventional multi-domain vertical alignment liquid crystal display panel 200 arranges at least one projection 217 on a color filter substrate 210 of the conventional vertical alignment liquid crystal display panel (such as the vertical alignment liquid crystal display panel 100 shown in FIG. 1), and the arrangement of the projection 217 allows nearby liquid crystal molecules to show tilting condition by following the surface contour of the projection 217, whereby the liquid crystal molecules of the liquid crystal layer 230 are lined up in a variety of directions to realize the division of multiple domains.

However, when the conventional multi-domain vertical alignment liquid crystal display panel 200 is in a dark state (namely displaying L0 gray level), the projection 217 also causes the nearby liquid crystal molecules to show corresponding tilting condition and thus light passing through theses liquid crystal molecules are rotated, whereby the rotated light may comprise a component that has a polarization direction corresponding to the polarization plate of the color filter substrates 210. This light component will partly transmit through the multi-domain vertical alignment liquid crystal display panel 200, causing light leakage. Thus, to alleviate the light leakage problem, it is desired to develop a novel liquid crystal display panel.

SUMMARY OF THE INVENTION

The present invention provides a multi-domain vertical alignment liquid crystal display panel to reduce the phenomenon of light leakage.

The technical solution that the present invention adopts to solve the technical problem is: providing a multi-domain vertical alignment liquid crystal display panel. The multi-domain vertical alignment liquid crystal panel comprises: a first substrate; a second substrate, which is opposite to the first substrate; a liquid crystal layer, which is interposed between the first substrate and the second substrate; at least one projection, which is a projection of piezoelectric crystal material and is formed in the first substrate; and at least one recess, which is formed in one of the first substrate and the second substrate, the recess being arranged to surround the projection; wherein when no voltage is applied, a lower surface of the projection is on the same horizontal plane as a lower surface of the first substrate so as to display a dark state; and when a voltage is applied, the projection bulges outward to have the lower surface of the projection projecting outward beyond the lower surface of the first substrate so as to display a bright state.

Preferably, the greater the applied voltage is, the greater the extent of bulging of the projection is.

Preferably, the first substrate is a color filter substrate, and the second substrate is a thin film transistor substrate.

Preferably, the first substrate comprises: a first transparent substrate; a common electrode layer, which is arranged at an inner side of the first transparent substrate; a first alignment film, which is arranged on the common electrode layer; and a first polarization plate, which is arranged at an outer side of the first transparent substrate.

Preferably, the second substrate comprises: a second transparent substrate; a pixel electrode layer, which is arranged at an inner side of the second transparent substrate; a first alignment film, which is arranged on the pixel electrode layer; and a second polarization plate, which is arranged at an outer side of the second transparent substrate.

Preferably, polarization direction of the first polarization plate and polarization direction of the second polarization plate are substantially perpendicular to each other.

Preferably, the first alignment film and the second alignment film work together to have liquid crystal molecules of the liquid crystal layer perpendicular to the first substrate and the second substrate in displaying a dark state.

Preferably, the liquid crystal layer comprises liquid crystal molecules that are negative type liquid crystal molecules.

Another technical solution that the present invention adopts to solve the technical problem is: a multi-domain vertical alignment liquid crystal display panel. The multi-domain vertical alignment liquid crystal display panel comprises: a first substrate; a second substrate, which is opposite to the first substrate; a liquid crystal layer, of which liquid crystal molecules are negative type liquid crystal molecules and is interposed between the first substrate and the second substrate; at least one projection, which is formed in the first substrate; and at least one recess, which is formed in one of the first substrate and the second substrate, the recess being arranged to surround the projection; wherein in displaying a dark state, a lower surface of the projection is on the same horizontal plane as a lower surface of the first substrate; and in displaying a bright state, the projection bulges outward to have the lower surface of the projection projecting outward beyond the lower surface of the first substrate.

A further technical solution that the present invention adopts to solve the technical problem is: providing multi-domain vertical alignment liquid crystal display panel, which comprises: a first substrate, a second substrate, a liquid crystal layer, and at least one projection. The second substrate is opposite to the first substrate. The liquid crystal layer is interposed between the first substrate and the second substrate. The projection is formed in the first substrate. In displaying a dark state, a lower surface of the projection is on the same horizontal plane as a lower surface of the first substrate; and in displaying a bright state, the projection bulges outward to have the lower surface of the projection projecting outward beyond the lower surface of the first substrate.

Preferably, the projection is a projection of piezoelectric crystal material, whereby when no voltage is applied, the lower surface of the projection is on the same horizontal plane as the lower surface of the first substrate so as to display a dark state; and when a voltage is applied, the projection bulges outward to have the lower surface of the projection projecting outward beyond the lower surface of the first substrate so as to display a bright state.

Preferably, the greater the applied voltage is, the greater the extent of bulging of the projection is.

Preferably, at least one recess is formed in one of the first substrate and the second substrate and the recess is arranged to surround the projection.

Preferably, the first substrate is a color filter substrate, and the second substrate is a thin film transistor substrate.

Preferably, the first substrate comprises: a first transparent substrate, a common electrode layer, a first alignment film, and a first polarization plate. The common electrode layer is arranged at an inner side of the first transparent substrate. The first alignment film is arranged on the common electrode layer. The first polarization plate is arranged at an outer side of the first transparent substrate.

Preferably, the second substrate comprises: a second transparent substrate, a pixel electrode layer, a first alignment film, and a second polarization plate. The pixel electrode layer is arranged at an inner side of the second transparent substrate. The first alignment film is arranged on the pixel electrode layer. The second polarization plate is arranged at an outer side of the second transparent substrate.

Preferably, polarization direction of the first polarization plate and polarization direction of the second polarization plate are substantially perpendicular to each other.

Preferably, the first alignment film and the second alignment film work together to have liquid crystal molecules of the liquid crystal layer perpendicular to the first substrate and the second substrate in displaying a dark state.

Preferably, the common electrode layer and the pixel electrode layer are made of a transparent conductive material.

Preferably, the liquid crystal layer comprises liquid crystal molecules that are negative type liquid crystal molecules.

When the multi-domain vertical alignment liquid crystal display panel according to the present invention is displaying a dark state, the projection does not undergo deformation, whereby the projection does not affect the liquid crystal molecules contained in the liquid crystal layer and thus no light leakage occurs; and in displaying a bright state, the projection is deformed to cause the liquid crystal molecules contained in the liquid crystal layer to show different tilt directions and thus inducing a plurality of fields and realizing division of multiple domains. Thus, the multi-domain vertical alignment liquid crystal display panel according to the present invention can reduce the occurrence of light leakage.

DETAILED DESCRIPTION OF THE PREFERRED EMBODIMENTS

To better expound the technical solution that the present invention adopts to achieve the objectives and the advantages thereof, a detailed description will be given, with reference to the attached drawings and preferred embodiments, to embodiments, method, process, structure, feature, and advantages of a multi-domain vertical alignment liquid crystal display panel provided by the present invention. The above discussed and other technical contents, features, and advantages of the present invention will clearly illustrated in the following detailed description of the preferred embodiments with reference to the attaché drawings. Through the description of the embodiments, a better understanding to the technical solution that the present invention adopts to achieve the predetermined objectives and the advantages thereof can be obtained. However, it is noted that the attached drawings are provided for illustration and reference, not intending to impose undue limitation to the present invention.

Figure 1:
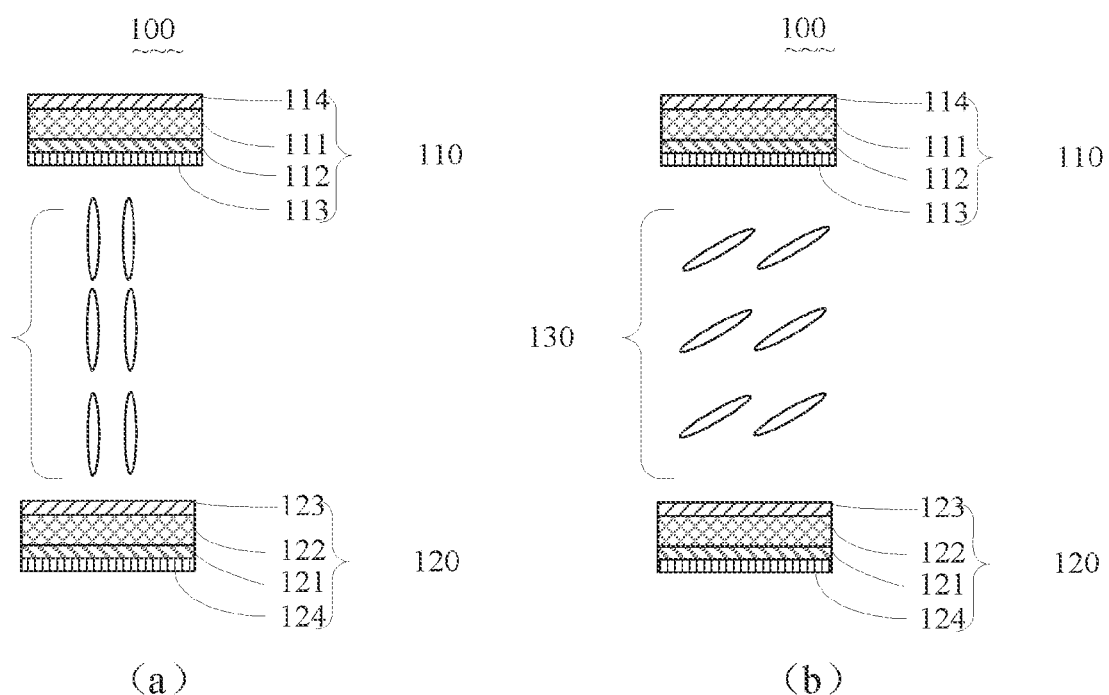
FIG. 1 is a schematic view showing a conventional vertical alignment liquid crystal display panel.
Figure 2:
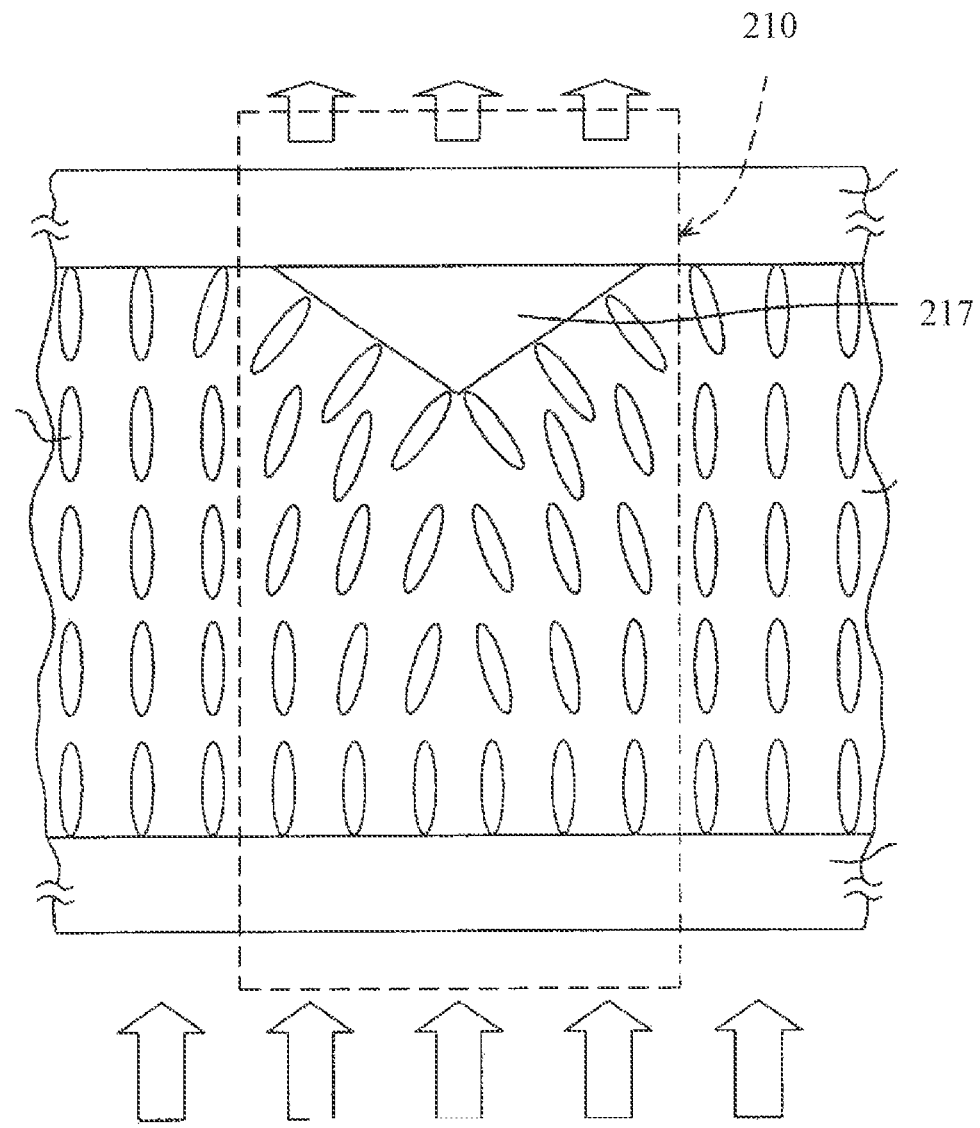
FIG. 2 is a schematic view showing a conventional multi-domain vertical alignment (MVA) liquid crystal display panel.
Figure 3:
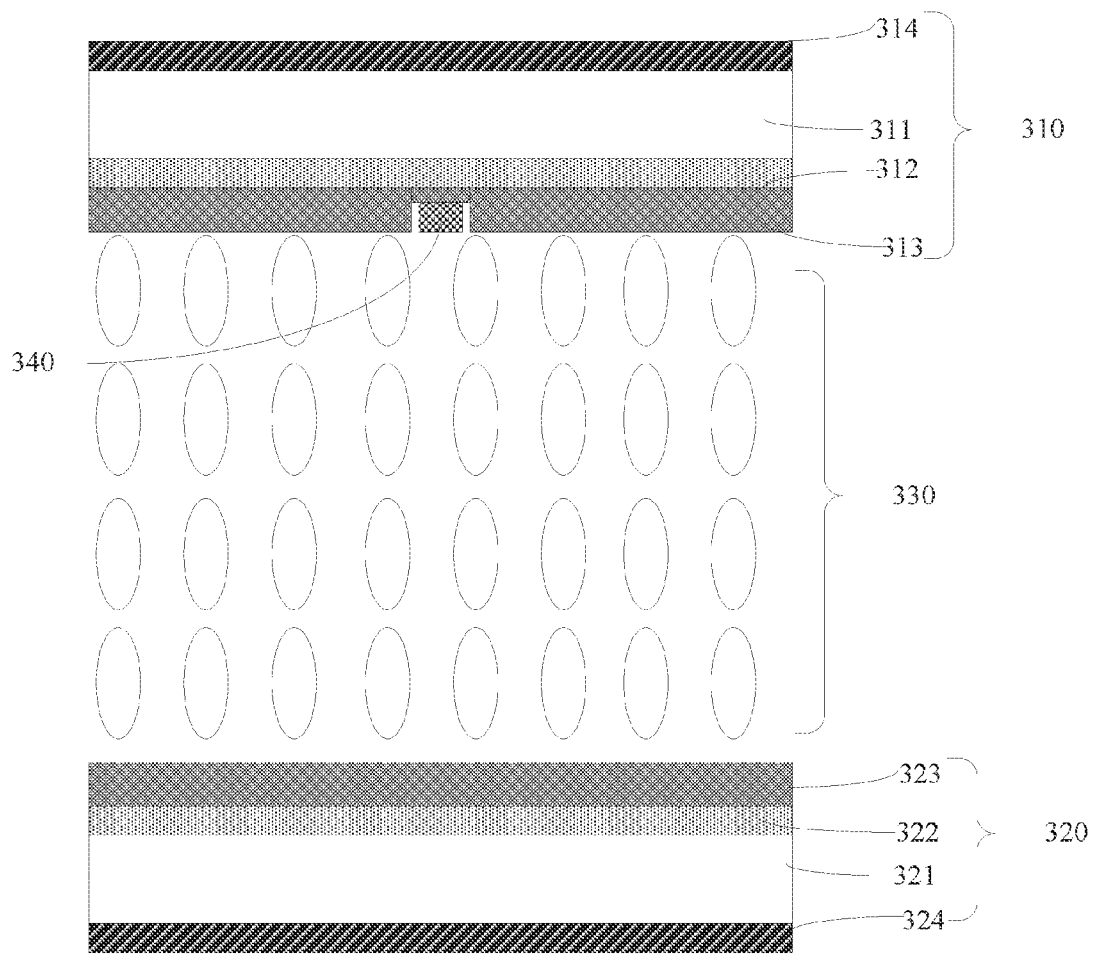
FIG. 3 is a schematic view showing a multi-domain vertical alignment liquid crystal display panel according to a preferred embodiment of the present invention.

FIG. 3 is a schematic view showing a multi-domain vertical alignment liquid crystal display panel according to a preferred embodiment of the present invention. As shown in FIG. 3, the multi-domain vertical alignment liquid crystal display panel 300 according to the present invention comprises a first substrate 310, a second substrate 320, and a liquid crystal layer 330 interposed between the two substrates.

The first substrate 310 can be a color filter substrate, which comprises a transparent substrate 311, a common electrode layer 312, an alignment film 313, and a polarization plate 314. The transparent substrate 311 can be a glass substrate. The common electrode layer 312 and the alignment film 313 are sequentially arranged at an inner side of the transparent substrate 311 to exactly oppose the liquid crystal layer 330, while the polarization plate 314 is arranged at an outer side of the transparent substrate 311. The common electrode layer 312 can be made of a transparent conductive material (such as, ITO or IZO material). Further, it is apparent to those having ordinary skills in the art that the first substrate 310 may further comprises a color filter (not shown) arranged thereon.

The second substrate 320 can be a thin film transistor substrate, which comprises a transparent substrate 321, a pixel electrode layer 322, an alignment film 323, and the polarization plate 324. The transparent substrate 321 can be a glass substrate. The pixel electrode layer 322 and the alignment film 323 are sequentially arranged at an inner side of the transparent substrate 321 to exactly oppose the liquid crystal layer 320, while the polarization plate 324 is arranged at an outer side of the transparent substrate 321. The pixel electrode layer 322 comprises a plurality of pixel electrodes (not labeled), which is made of a transparent conductive material (such as, ITO or IZO material). Further, it is apparent to those having ordinary skills in the art that the second substrate 320 may further comprise an array of thin film transistors (not shown) arranged thereon and the pixel electrodes are respectively controlled by corresponding thin film transistors of thin film transistor array.

The liquid crystal molecules contained in the liquid crystal layer 330 contains are negative type liquid crystal molecules, namely having $\Delta\epsilon$ less than 0. Further, the alignment film 313 of the first substrate 310 and the alignment film 323 of the lower substrate 320 work together to have the liquid crystal molecules contained in the liquid crystal layer 330 substantially perpendicular to the first substrate 310 and the second substrate 320 in a dark state (namely not in operation).

The polarization plate 314 of the first substrate 310 and the polarization plate 324 of the second substrate 320 have polarization directions that are substantially perpendicular to each other, namely the polarization directions are different by 90 degrees.

Further, the multi-domain vertical alignment liquid crystal display panel 300 of the present invention further comprises at least one projection 340, which is formed in the first substrate 310. Preferably, the projection 340 is made of a piezoelectric crystal material, which undergoes deformation when being applied with a voltage.

Figure 4:
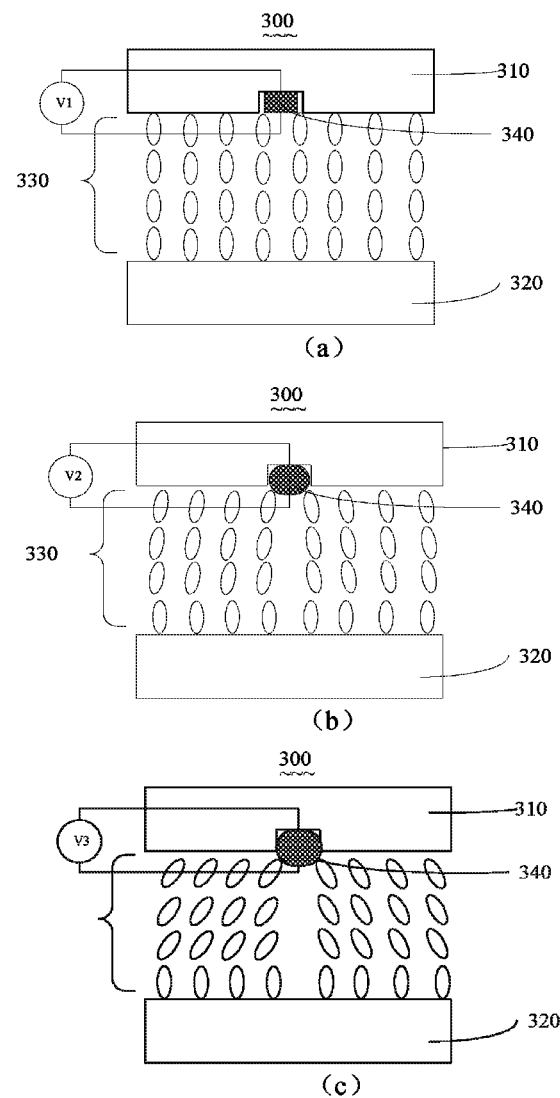
FIGS. 4(a)-4(c) are schematic views illustrating the operation principle of the multi-domain vertical alignment liquid crystal display panel shown in FIG. 3.

The operation principle of the multi-domain vertical alignment liquid crystal display panel according to the present invention will be described. FIG. 4 is a schematic view illustrating the operation principle of the multi-domain vertical alignment liquid crystal display panel shown in FIG. 3. For the purposes of simplification of the description, FIG. 4 shows only the components that are needed in the present invention, while other components/elements are omitted, in which FIG. 4($a$) is a schematic view showing the multi-domain vertical alignment liquid crystal display panel of the present invention displaying a dark state, and FIGS. 4($b$)-4($c$) are schematic views showing the multi-domain vertical alignment liquid crystal display panel of the present invention displaying a bright state.

As shown in FIG. 4($a$), in displaying a dark state, the projection 340 is applied with no voltage so that the projection 340 does not undergo deformation and a lower surface of the projection 340 is on the same horizontal plane as a lower surface of the first substrate 310. Thus, the projection 340 does not cause an influence on the liquid crystal molecules contained in the liquid crystal layer 330 and no light leakage occurs.

As shown in FIGS. 4($b$)-4($c$), in displaying a bright state, the projection 340 is applied with a voltage so that the projection 340 undergoes deformation and bulges outward, making the lower surface of the projection 340 projecting outward beyond the lower surface of the first substrate 310. The bulging of the projection 340 causes the nearby liquid crystal molecules to show different tilting condition so that liquid crystal molecules contained in the liquid crystal layer 330 show a plurality of tilt direction thereby inducing a plurality of fields to realize division of multiple domains.

Further, since the projection 340 is made of a piezoelectric crystal material, the bulging thereof increases with the increase of the applied voltage. Thus, in displaying a middle gray level image, a small voltage is applied to the projection 340 to induce a small extent of bulging of the projection 34, as shown in FIG. 4($b$). In displaying a high gray level image, a large voltage is applied to the projection 340 to induce a large extent of bulging of the projection 340, as shown in FIG. 4($c$). Thus, the present invention allows of applying different voltages to the projection 340 to induce different extents of bulging of the projection 340 in order to obtain the optimum displaying effect.

Certainly, those skilled in the art can easily appreciate that the projection 340 of the present invention can be made of other shape-variable material, such as pressure-induced deformation material, provided the lower surface of the projection 340 and the lower surface of the first substrate 310 are on the same horizontal plane when the multi-domain vertical alignment liquid crystal display panel is displaying a dark state; and means is available to cause deformation of the projection 340 for making the lower surface of the projection 340 projecting beyond the lower surface of the first substrate 310 in displaying a bright state.

Figure 5:
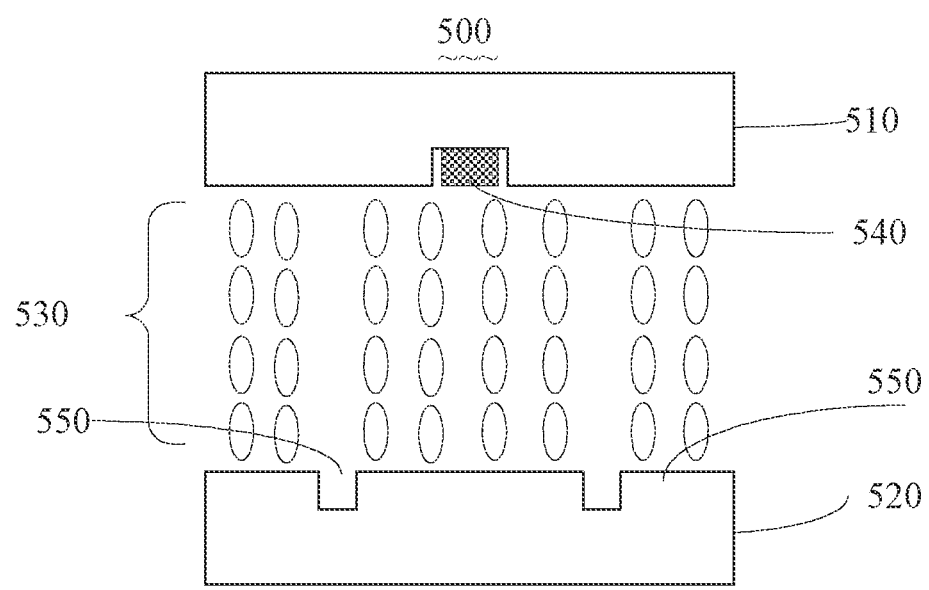
FIG. 5 is a schematic view illustrating a multi-domain vertical alignment liquid crystal display panel according to another preferred embodiment of the present invention

FIG. 5 is a schematic view illustrating a multi-domain vertical alignment liquid crystal display panel according to another preferred embodiment of the present invention. As shown in FIG. 5, the multi-domain vertical alignment liquid crystal display panel 500 according to the instant embodiment is similar to the multi-domain vertical alignment liquid crystal display panel 300 shown in FIG. 3-4 and comprises a first substrate 510 that serves as a color filter substrate, a second substrate 520 that serves as a thin film transistor substrate, and a liquid crystal layer 530 interposed between the two substrates. The first substrate 510 also comprises at least one projection 540 arranged thereon, which is made of a piezoelectric crystal material and undergoes deformation when a voltage is applied thereto.

Further, in the instant embodiment, the second substrate 520 comprises at least one recess 550 formed therein and arranged to surround the projection 540, whereby the recess 550 cooperates with the projection 540 to make the liquid crystal molecules contained in the liquid crystal layer 530 lining up in multiple direction and thus realizing division of multiple domains. Those skilled in the art may appreciate that the second substrate 520 is a thin film transistor substrate, so that each pixel comprises an independent thin film transistor (TFT) and a pixel electrode, and the independent thin film transistors and the pixel electrodes make the surface of the second substrate 520 corrugating thereby forming the recesses 550. Further, those skilled in the art may appreciate that the recess 550 may be also formed in the first substrate 510 to cooperate with the projection 540 formed in the first substrate 510 to realize division of multiple domains of the liquid crystal molecules contained in the liquid crystal layer 530.

In summary, when the multi-domain vertical alignment liquid crystal display panel according to the present invention is displaying a dark state, the projection does not undergo deformation, whereby the projection does not affect the liquid crystal molecules contained in the liquid crystal layer and thus no light leakage occurs; and in displaying a bright state, the projection is deformed to cause the liquid crystal molecules contained in the liquid crystal layer to show different tilt directions and thus inducing a plurality of fields and realizing division of multiple domains. Thus, the multi-domain vertical alignment liquid crystal display panel according to the present invention can overcome the drawbacks existing in the prior art technology and eliminate the occurrence of light leakage.

Although a description has been made for the embodiments of the present invention, but it does not intend to impose any undue limitation to the present invention. Those having ordinary skills in the art may make various alteration and modification without departing from the spirit and scope of the present invention. Thus, the protection scope of the present invention is only defined by the appended claims.

What is claimed is:

1. A multi-domain vertical alignment liquid crystal display panel, wherein the multi-domain vertical alignment liquid crystal display panel comprises:
   a first substrate;
   a second substrate, which is opposite to the first substrate;
   a liquid crystal layer, which is interposed between the first substrate and the second substrate;
   at least one projection, which is a projection of piezoelectric crystal material and is formed in the first substrate; and
   at least one recess, which is formed in one of the first substrate and the second substrate, the recess being arranged to surround the projection;
   wherein when no voltage is applied, a lower surface of the projection is on the same horizontal plane as a lower surface of the first substrate so as to display a dark state; and when a voltage is applied, the projection bulges outward to have the lower surface of the projection projecting outward beyond the lower surface of the first substrate so as to display a bright state.

2. The multi-domain vertical alignment liquid crystal display panel as claimed in claim 1, wherein the greater the applied voltage is, the greater the extent of bulging of the projection is.

3. The multi-domain vertical alignment liquid crystal display panel as claimed in claim 1, wherein the first substrate is a color filter substrate, and the second substrate is a thin film transistor substrate.

4. The multi-domain vertical alignment liquid crystal display panel as claimed in claim 3, wherein the first substrate comprises:
   a first transparent substrate;
   a common electrode layer, which is arranged at an inner side of the first transparent substrate;
   a first alignment film, which is arranged on the common electrode layer; and
   a first polarization plate, which is arranged at an outer side of the first transparent substrate.

5. The multi-domain vertical alignment liquid crystal display panel as claimed in claim 4, wherein the second substrate comprises:
   a second transparent substrate;
   a pixel electrode layer, which is arranged at an inner side of the second transparent substrate;
   a second alignment film, which is arranged on the pixel electrode layer; and
   a second polarization plate, which is arranged at an outer side of the second transparent substrate.

6. The multi-domain vertical alignment liquid crystal display panel as claimed in claim 5, wherein polarization direction of the first polarization plate and polarization direction of the second polarization plate are substantially perpendicular to each other.

7. The multi-domain vertical alignment liquid crystal display panel as claimed in claim 5, wherein the first alignment film and the second alignment film work together to have liquid crystal molecules of the liquid crystal layer perpendicular to the first substrate and the second substrate in displaying a dark state.

8. The multi-domain vertical alignment liquid crystal display panel as claimed in claim 5, wherein the liquid crystal layer comprises liquid crystal molecules that are negative type liquid crystal molecules.

9. A multi-domain vertical alignment liquid crystal display panel, wherein the multi-domain vertical alignment liquid crystal display panel comprises:
   a first substrate;
   a second substrate, which is opposite to the first substrate;
   a liquid crystal layer, of which liquid crystal molecules are negative type liquid crystal molecules and is interposed between the first substrate and the second substrate; and
   at least one projection, which is formed in the first substrate; and at least one recess, which is formed in one of the first substrate and the second substrate, the recess being arranged to surround the projection;
   wherein in displaying a dark state, a lower surface of the projection is on the same horizontal plane as a lower surface of the first substrate; and in displaying a bright state, the projection bulges outward to have the lower surface of the projection projecting outward beyond the lower surface of the first substrate.

10. A multi-domain vertical alignment liquid crystal display panel, wherein the multi-domain vertical alignment liquid crystal display panel comprises:
    a first substrate;
    a second substrate, which is opposite to the first substrate;

a liquid crystal layer, which is interposed between the first substrate and the second substrate; and at least one projection, which is formed in the first substrate;

wherein in displaying a dark state, a lower surface of the projection is on the same horizontal plane as a lower surface of the first substrate; and in displaying a bright state, the projection bulges outward to have the lower surface of the projection projecting outward beyond the lower surface of the first substrate.

11. The multi-domain vertical alignment liquid crystal display panel as claimed in claim 10, wherein the projection is a projection of piezoelectric crystal material, whereby when no voltage is applied, the lower surface of the projection is on the same horizontal plane as the lower surface of the first substrate so as to display a dark state; and when a voltage is applied, the projection bulges outward to have the lower surface of the projection projecting outward beyond the lower surface of the first substrate so as to display a bright state.

12. The multi-domain vertical alignment liquid crystal display panel as claimed in claim 11, wherein the greater the applied voltage is, the greater the extent of bulging of the projection is.

13. The multi-domain vertical alignment liquid crystal display panel as claimed in claim 10, wherein at least one recess is formed in one of the first substrate and the second substrate and the recess is arranged to surround the projection.

14. The multi-domain vertical alignment liquid crystal display panel as claimed in claim 10, wherein the first substrate is a color filter substrate, and the second substrate is a thin film transistor substrate.

15. The multi-domain vertical alignment liquid crystal display panel as claimed in claim 14, wherein the first substrate comprises:

a first transparent substrate;

a common electrode layer, which is arranged at an inner side of the first transparent substrate;

a first alignment film, which is arranged on the common electrode layer; and a first polarization plate, which is arranged at an outer side of the first transparent substrate.

16. The multi-domain vertical alignment liquid crystal display panel as claimed in claim 15, wherein the second substrate comprises:

a second transparent substrate;

a pixel electrode layer, which is arranged at an inner side of the second transparent substrate;

a second alignment film, which is arranged on the pixel electrode layer; and a second polarization plate, which is arranged at an outer side of the second transparent substrate.

17. The multi-domain vertical alignment liquid crystal display panel as claimed in claim 16, wherein polarization direction of the first polarization plate and polarization direction of the second polarization plate are substantially perpendicular to each other.

18. The multi-domain vertical alignment liquid crystal display panel as claimed in claim 16, wherein the first alignment film and the second alignment film work together to have liquid crystal molecules of the liquid crystal layer perpendicular to the first substrate and the second substrate in displaying a dark state.

19. The multi-domain vertical alignment liquid crystal display panel as claimed in claim 16, wherein the common electrode layer and the pixel electrode layer are made of a transparent conductive material.

20. The multi-domain vertical alignment liquid crystal display panel as claimed in claim 10, wherein the liquid crystal layer comprises liquid crystal molecules that are negative type liquid crystal molecules.

* * * * *